United States Patent
Panchapakesan et al.

(10) Patent No.: US 11,057,442 B2
(45) Date of Patent: Jul. 6, 2021

(54) SYSTEM AND METHOD FOR WORKSPACE SHARING

(71) Applicant: VMWARE, INC., Palo Alto, CA (US)

(72) Inventors: Ramani Panchapakesan, Bangalore (IN); Pradeep B H Pai, Bangalore (IN); Usha Kamath, Bangalore (IN); Ben Joseph, Bangalore (IN); Sharun Samuel, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 259 days.

(21) Appl. No.: 15/920,484

(22) Filed: Mar. 14, 2018

(65) Prior Publication Data

US 2019/0238601 A1 Aug. 1, 2019

(30) Foreign Application Priority Data

Jan. 27, 2018 (IN) .............................. 201841003142

(51) Int. Cl.
| | |
|---|---|
| *H04L 29/06* | (2006.01) |
| *G06F 21/44* | (2013.01) |
| *H04L 29/08* | (2006.01) |
| *G06F 8/61* | (2018.01) |

(52) U.S. Cl.
CPC ............ *H04L 65/403* (2013.01); *G06F 21/44* (2013.01); *H04L 67/141* (2013.01); *G06F 8/61* (2013.01)

(58) Field of Classification Search
CPC ..... H04L 65/403; H04L 67/141; G06F 21/44; G06F 8/61
See application file for complete search history.

(56) References Cited

U.S. PATENT DOCUMENTS

| | | | | |
|---|---|---|---|---|
| 9,323,916 | B1* | 4/2016 | Wu | G06F 21/44 |
| 2009/0172101 | A1* | 7/2009 | Arthursson | G06F 3/0486 709/205 |
| 2010/0306676 | A1* | 12/2010 | Srinivasaraghavan | G06Q 10/10 715/758 |
| 2011/0299613 | A1* | 12/2011 | Duff | H04L 43/10 375/260 |
| 2013/0189925 | A1* | 7/2013 | Staskawicz | H04B 7/24 455/41.1 |
| 2013/0191903 | A1* | 7/2013 | Jaudon | H04L 63/08 726/7 |
| 2014/0032691 | A1* | 1/2014 | Barton | H04L 41/00 709/206 |
| 2014/0344420 | A1* | 11/2014 | Rjeili | H04L 43/04 709/220 |
| 2014/0358695 | A1* | 12/2014 | Setton | G06Q 30/0277 705/14.69 |

(Continued)

*Primary Examiner* — Philip J Chea
*Assistant Examiner* — Wuji Chen
(74) *Attorney, Agent, or Firm* — Clayton, McKay & Bailey, PC

(57) ABSTRACT

A system and method of communicating between computing devices including pairing a first computing device with a second computing device. The first computing device and the computing second device are configured to communicate with an application workspace system. The first computing device provides token and application information to a second computing device. The second computing device is authenticated with the application workspace system using the token and launches an application corresponding to the application information.

19 Claims, 8 Drawing Sheets

(56) References Cited

U.S. PATENT DOCUMENTS

| | | | |
|---|---|---|---|
| 2015/0134967 A1* | 5/2015 | Moore | H04L 9/3263 |
| | | | 713/175 |
| 2015/0180983 A1* | 6/2015 | Hitomi | H04L 67/306 |
| | | | 709/203 |
| 2016/0112374 A1* | 4/2016 | Branca | H04L 63/102 |
| | | | 726/1 |
| 2017/0111761 A1* | 4/2017 | Tarlton | G06F 9/45558 |
| 2017/0149853 A1* | 5/2017 | Furuichi | G06F 9/45558 |
| 2017/0231022 A1* | 8/2017 | Ito | H04L 67/34 |
| 2019/0089790 A1* | 3/2019 | Bathiche | H04L 63/08 |
| 2019/0281039 A1* | 9/2019 | Moore | H04L 63/0281 |
| 2019/0306904 A1* | 10/2019 | Iyer | H04W 4/70 |

* cited by examiner

SYSTEM AND METHOD FOR WORKSPACE SHARING

RELATED APPLICATIONS

Benefit is claimed under 35 U.S.C. 119(a)-(d) to Foreign Application Serial No. 201841003142 filed in India entitled "SYSTEM AND METHOD FOR WORKSPACE SHARING", on Jan. 27, 2018, by VMware, Inc., which is herein incorporated in its entirety by reference for all purposes.

TECHNICAL FIELD

The present invention relates to methods and systems for providing to workspaces across multiple computing devices.

BACKGROUND

Sharing applications between computing devices commonly includes casting or mirroring an application between computing devices. When an application is cast between devices, both devices are required to include an installed instance of that application and information is shared between those applications. Further, mirroring computing devices only replicates the information displayed on a first computing device on a second computing device. In both instances, the second computing device is limited in what it is able to display and corresponding functionality.

In some instances, there is a benefit to providing a second computing device with more than mere access to a shared application and/or a mirrored display. Hence, by providing multiple computing devices with access to a secure workspace, the computing devices will have access to the same applications and information.

SUMMARY

In one embodiment, a method of communicating between computing devices includes pairing a first computing device with a second computing device configured to communicate with the application workspace system. The method further comprises providing a token and application information from the first computing device to the second computing device and authenticating the second computing device with the application workspace system using the token. Further, the method comprises accessing an application corresponding to the application information located on the second computing device.

In another embodiment, a system for communicating between computing devices includes pairing a first computing device with a second computing device. The first computing device and the computing second device are configured to communicate with an application workspace system. The first computing device provides a token and application information to a second computing device. The second computing device is authenticated with the application workspace system using the token and accesses content corresponding to the application information.

DETAILED DESCRIPTION

Figure 1:
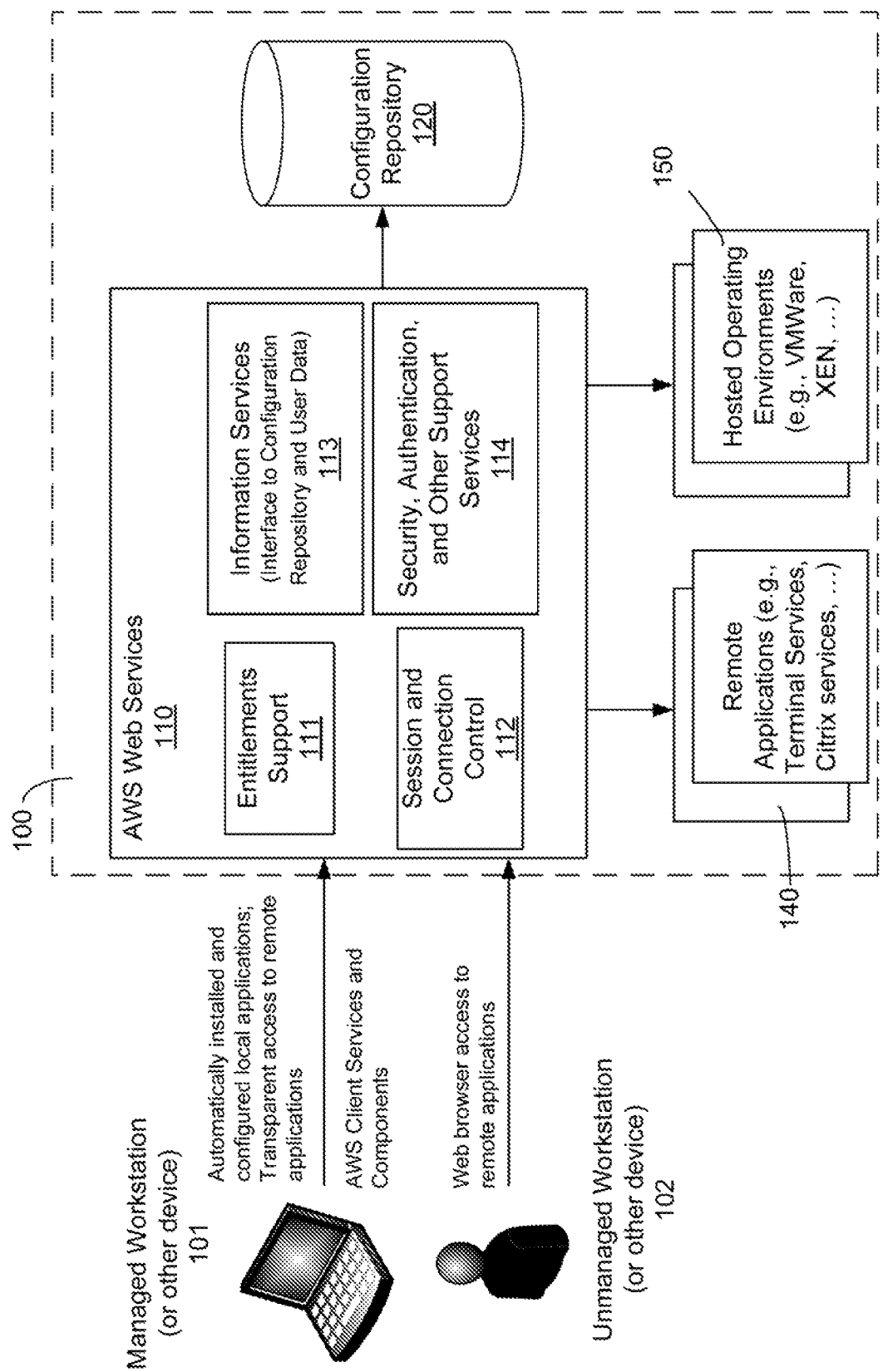
FIG. 1 is an overview block diagram of an Application Workspace System, according to one or more embodiments.

Embodiments of the present description provide enhanced computer- and network-based methods and systems for determining applications to which a user is entitled and providing seamless and uniform access to these applications, regardless of their type and where they are accessed from. Example embodiments provide an Application Workspace System ("AWS"), which enables users to access remote server-based applications (e.g., thin client applications, terminal server applications, applications on hosted operating systems, etc.) using the same interface that they use to access local applications, without needing to know where the application is being accessed. The AWS includes a set of client and server components that implement the notion of a user's virtual workspace, which is presented to the user either seamlessly integrated into the native user interface (such as Windows Explorer) or via a web portal which presents a virtual desktop.

The AWS automatically determines which applications the user is entitled to use, and then determines automatically, based upon a variety of parameters, which applications are to be made available to the user (resolved to version, particular package etc.), and whether they are to be installed locally, or accessed remotely. Entitled as used herein refers to more than just a concept of access permissions—it involves evaluating a series of rules that specify how applications have been administered for which users and to run in which environments. The parameters that influence this decision define, for example, the user, the access point (the device from which the workspace is accessed), the delivery method (remote, local, etc.) the user's entitlements, application administration parameters, etc. Applications can be associated with users in a "generic" fashion so that they can be "dynamically bound" to a user's access at various times. Thus, the AWS can separate out the administration of applications to users generically (for example, assigning a word processing application to a user) from the administration of actual application implementations that correspond to different versions, packages delivery methods, etc. In this manner, seamless integration of both local and remote applications is made possible.

In the case of applications that are installed locally, the AWS provides for the customization of the configuration and behavior of such applications via scripts that hook system events such as login, power-down, etc. or disconnect or reconnect on terminal servers. In the case of remote applications that are made available, for example, through a terminal server, extensive application behavior modification is supported using a rules-based engine.

The AWS also provides a generalized message bus that can be used for load balancing and resource discovery.

In addition, the AWS provides a generalized LDAP replication mechanism using XSLT stylesheets that can replicate data between heterogeneous schemas. The use of XSLT for replication is extendible to other directory server mechanisms or other information consuming processes that entail heterogeneous data organizations.

The following description details an example embodiment of an Application Workspace System, called "Workspace ONE™". Other implementations of the various principles, methods, techniques, components, protocols, etc. can be incorporated to provide other embodiments of an AWS. Thus, the present description means to include all such possible embodiments of an AWS.

The Application Workspace System implements an abstraction referred to as a "virtual workspace" that integrates seamlessly into whatever device environment a user uses to access applications. On a personal computer running Windows, for example, once configured, applications appear as icons, which can be "opened" to start an application running (i.e., to launch an application). The AWS automatically configures the user's environment so that the user need not know the particular application that is being run—from a version/package perspective or from a location perspective—an application may be run locally or remotely.

The AWS abstracts the notion of an application so that the task of associating applications with users is separated from the administrative task of mapping particular implementations of the applications to different access devices (from where the application is accessed and how the application is accessed—e.g., a portable or desktop). For example, the directory services (e.g., LDAP) setup of application implementation mappings is an administrative task that need not involve lay users.

In one embodiment, to accomplish this abstraction, applications are modeled as belonging to an "application family" that represents the application in an abstract sense (e.g., "Office"). Thus, for example, all kinds of different versions of Microsoft Office may be abstracted as a single family "Office." Specific applications that can be thought of as instances of those application families (called application objects) delivered via specific means (e.g., "Microsoft Office 2003—Local", "OpenOffice for Mac—Local", "Microsoft Office 200—Remote"). This information is stored in an AWS configuration repository, which is typically an LDAP directory, although equivalent storage repositories, protocols, and directory servers may be used.

Stored within the application family object in the configuration repository are a set of rules (sometimes referred to as "policy") that describes how an application family is to be resolved to a specific application instance at the point of use. Point of use (also referred to as point of access herein) refers to a description of the environment where from the user is attempting to access a particular application. For example, a mobile device being used while traveling abroad typically will be characterized as a different point of use than the user's home personal computer. As a result, the AWS may desire to give the user access to a different application instance than the user normally uses while at home.

Entitlements comprise the definitions (including all the attributes) of the set of application family objects, application objects (including all relevant sub-objects such as document types and launch items) associated package container objects and package objects, along with tuples from all the user's user groups, that a given user may have available to him or her at any time. A set of entitlements for a user can be derived from the AWS configuration repository. A process referred to as entitlements resolution further refines a set of entitlements to the set of application objects (and hence the relevant associated objects from the set listed above) that a user actually has available to him or her at a particular point in time.

Assignment of applications (in the general sense) to users is accomplished by creating links in the AWS data model between users and application families—thus allowing for non-IT literate administrators to manage which applications their users need to be able to use without having to be cognizant of the various versions and delivery mechanisms that may by appropriate at specific locations or from specific access devices (such as via a PC or a PDA).

The abstraction of applications breaks the administration of applications into two areas: user administration, which describes which users are associated with which applications families; and application administration, which is typically an IT (information technology) function that provides the rules indicating under which circumstances an application family resolves to a specific application. Note that user administration may administer to any defined group instead of to an individual user using any type of grouping mechanism. Groups may also substitute for other entities in the AWS data model.

Note that, for the purposes of this description, the term "application" is used to mean a set of modules, code, script, text or other represented code and/or programs that execute on either hardware machines or higher level virtual machines or are executed by other programs that overall allows a user to achieve some task using the computer (i.e., "apply the computer" to a task). Also, a "package" is a specific set of modules, code, script, text or other represented code and/or programs that execute on either hardware machines or higher level virtual machines or are executed by other programs that are delivered together in some manner. Thus, an application comprises one or more packages. Within an AWS configuration repository, "application objects" are used to represent applications, and "package objects" are used to represent packages.

Note as well that the term "local" or "remote" with reference to applications indicates where, relative to the user, processing occurs in order for the user to achieve the task using the application. Note that this is distinct from where the user interacts with the application through an input device (e.g., screen, keyboard, mouse etc.) as the use of the input device typically will be on the computer the user is physically interacting with.

When a user attempts to login to the user's environment, and at other times, the AWS attempts to automatically determine the virtual workspace for that user from the point of access. In the case of a computing device such as a desktop computer, this determination process results in presenting the user with a set of icons on the desktop that map to particular applications. As an effect of this process, local applications are properly configured, installed, removed, customized and possibly updated, and remote application access is integrated into the virtual workspace. That way, when a user "clicks" on an icon to invoke the underlying application, the "right" thing just happens, be it local or remote. Which applications are installed or configured is determined based upon a process referred to as "entitlements resolution."

Entitlements resolution is the decision process that resolves an application family object to an application object so that the corresponding application instance can be made available to a user. This is performed at the point of use, and has various pieces of information made available to it from the environment and from the AWS data model. Such information includes, for example, location, network address, access device type, pre-defined tuples (for example, name-value pairs) that may be stored on the access device, and tuples that are associated with any application object in the AWS data model.

Entitlements resolution typically takes place at a point of entry to the system—in many implementations, this can be one of two places:

An "intelligent" access device (e.g., a computing system that can perform local processing and has elements of the AWS installed on it); and A remote interface—usually manifesting itself as a web application, and commonly part of a web portal.

The entitlements resolution process can result in the AWS needing to transparently install or configure or remove or otherwise manage locally installed applications. It can also result in automatically presenting to the user applications that the user is able to use remotely (for example, if no local application availability is present or, for example, to possible override a locally installed application in favor of a remote one). In order to achieve access to remote applications, any icon or link representing the application includes an encoding of a primary key of the application object in the configuration repository (usually a Distinguished Name (a "DN") to an LDAP object). This identifying key is used to get information from an AWS configuration repository regarding the details needed to run the application.

Note that many different kinds of remotely accessed applications can be integrated into an AWS. For example, an AWS can integrate and support terminal server applications (which run applications in sessions specific to a client access and which are isolated from other applications), Citrix applications (which provide an extension to the general case of Terminal Server applications), Terminal Emulators for character based protocols, virtual machine environments such as hosted operating environments using, for example, VMware, on-demand application streaming, and any other form of application delivery. The general distinction that the AWS draws between a "local" and a "remote" application is that a local application is some form of code, script or otherwise that executes locally on the user's computer in a manner native to the local computer's native operating system to perform the functions of the application, whereas a remote application has some form of code, script, module or otherwise executing on a computer other than that which the user is using, and any code in that instance that executes locally on the computer the user is using does so only to provide screen, keyboard and mouse functionality for that remote application.

If the entitlements resolution process results in providing a user with access to remote applications, then the mechanism by which they are actually launched (described in detail below) uses web-based components and systems that are common to both access from a workstation running components of the AWS (e.g., a managed workstation) and from a workstation running a browser with a Java Virtual Machine that is used to navigate to a web-based portal (e.g., an unmanaged workstation). In some embodiments, the behavior of remote applications is automatically modified to behave properly when they are launched at their point of use. Behavior modification of applications is also described further below.

Different implementations of an AWS may present different sets of components and services to effectuate the notion of a virtual workspace. In an example AWS, the Workspace includes a set of tools, modules, data schemas (data models) etc., which are delivered to customers as a set of integrate-able components and/or services. A typical AWS includes: a manager component; a server component; and an analyzer component.

The manager component comprises a set of modules downloaded to a client machine to allow a user to install and run applications locally (or as a "terminal" to remote applications), which are automatically configured and customized on a per-user basis and for the user's environment. A node manager component of the manager component provides a majority of the AWS support for installation and configuration, event based script customization of applications, and communications with the server component.

The server component comprises the entirety of network-based components (e.g., web-based components) that support access from intelligent workstations and access from browsers (via a portal). These components include the ability to perform entitlements resolution, user administration, application administration, application personalization and behavior modification, etc. and implement the virtual workspace.

The analyzer component comprise an extensive set of tools which are used to assist administrators in determining mappings for applications to application families, exclusions, conflicts, dependencies, which users use which applications, etc. A kernel manager component of the analyzer performs application usage based upon detecting a variety of activities—at levels of actual use, not just invocation—on both intelligent workstations and on terminal servers. The detection occurs by "hooking" various system codes to be made aware when certain events are triggered.

FIG. 1 is an overview block diagram of an Application Workspace System 100, including example components of example Application Workspace System (AWS) web services. In one embodiment, the AWS comprises one or more functional components/modules that work together to provide personalized and on-demand configuration of and access to local and remote application. These components may be implemented in software or hardware or a combination of both. In FIG. 1, Application Workspace System 100 comprises a client side, herein shown as managed workstation 101 and unmanaged workstation 102, and a server side, show as AWS Web Services 110. A managed (or "intelligent") computing device, such as managed workstation 101 is a device (e.g., a Windows workstations) that has installed on it an instance of the AWS Manager (described below with respect to FIG. 2). The computing device may be any one of a personal computing device, portable phone device, tablet device, or the like. An unmanaged computing device, such as workstation 102 is a device with no AWS software installed on it, but does have a browser and a Java virtual machine available to navigate to a portal provided by the AWS Web Services 110. The Web Services component 110 provides a variety of AWS components and services such as support for entitlements 111; information services 113 for access to the configuration repository 120, for example; session and connection control 112, for example to remote applications 120 needing terminal emulation or session management or to access hosted operating environments 150; and security, authentication, and other support services 114. In one embodiment the configuration repository 120 for application configuration and association data is implemented by a Lightweight Directory Access Protocol (LDAP) server.

Figure 2:
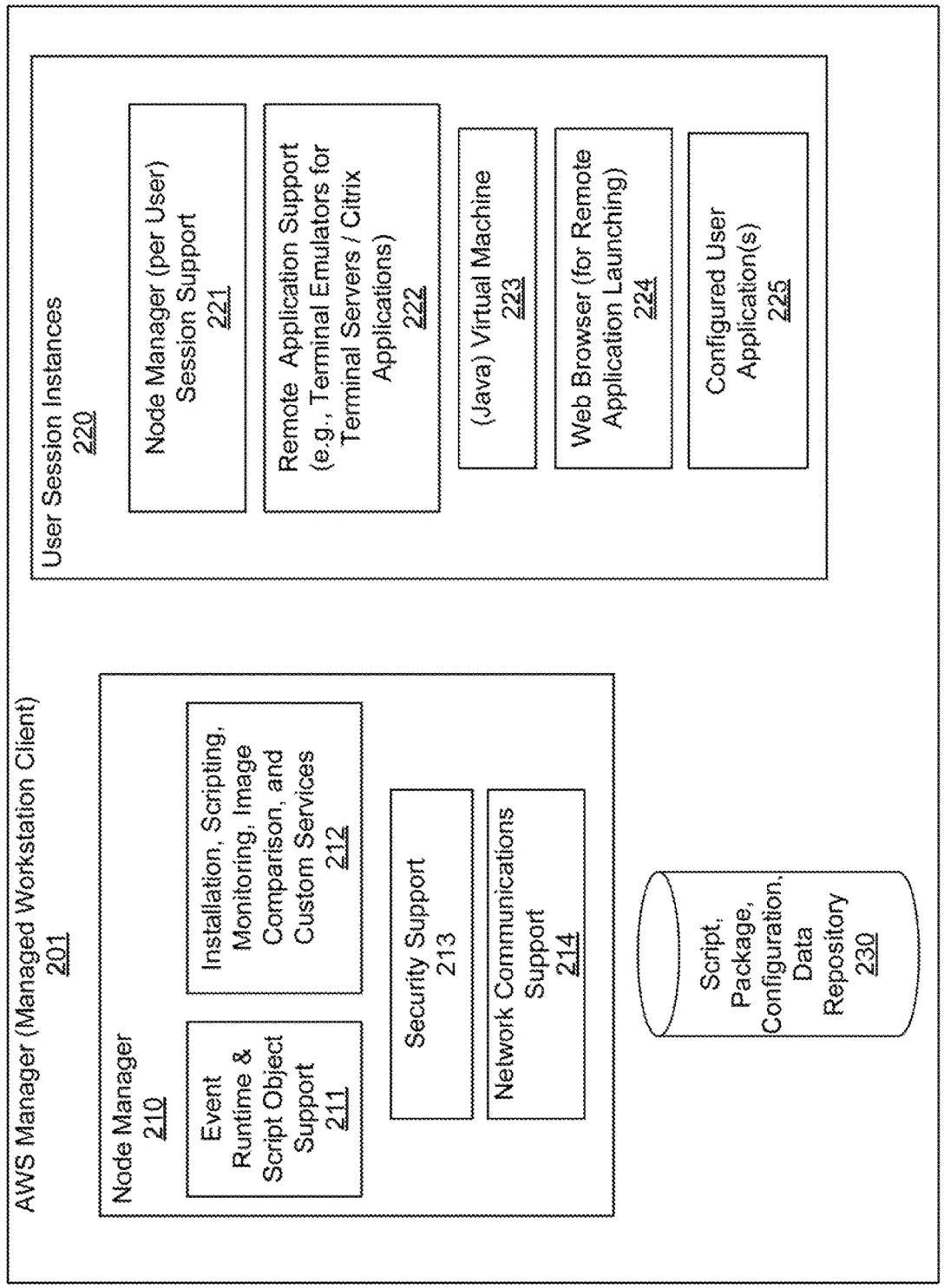
FIG. 2 is an overview block diagram of example components of example Application Workspace System client services according to one or more embodiments.

FIG. 2 is an overview block diagram of example components of example Application Workspace System client services. In one example embodiment, the client portion of the AWS that resides on a managed computing system is known as the AWS Manager. The AWS Manager 201 comprises Node Manager 210 that executes in the SYSTEM security context, and User Session Manager 220 that executes in the security context of the user, and any number of remote application support processes 222 that manage access to remote applications on the managed workstation. AWS Manager 201 also comprises local script, package, and configuration data repository 210 whose data corresponds to the "state" of installed applications on the managed workstation.

Note that the use of the term "workstation" is a matter of ease of description is not meant to convey a specific arrangement of hardware or software. Essentially, any computing device capable of performing the functions indicated can be substituted where this description uses the term "workstation." Thus, workstations may be mobile or wired device, embedded systems, PDAs, cellular devices, etc.

Node Manager 210 comprises a set of services, modules, and code for supporting the functions of an AWS (AWS 100) to implement a virtual workspace. The node manager provides all the necessary functions for packaging, installation, scripting, management, diagnostics, tracing and any ancillary functions that AWS uses. In particular, the Node Manger 210 comprises event runtime and script object support 211; installation, scripting, monitoring, image comparison, and custom services 212; security support 213, and support for network communications 214, for example with the AWS web services.

Note that in some embodiments, some of the code of the Node Manager 210, because it performs "smart" configuration, can also be used by terminal servers to configure remote applications made available through terminal servers, because many of the same functions are needed to configure remote applications. For example, the Node Manager code may also be used for Windows Terminal Servers and Citrix Servers as a system service. This shared code is mainly a figment of efficient implementation, though, and is not a requirement of an AWS.

The user session(s) instances 220 comprise all of the local support needed to interface to local and remote applications using AWS. It typically includes instances of the Node Manager session support 221 that are specific to the user and the particular session; terminal emulation support 222 for interfacing to remote applications; a JAVA virtual machine 223 (although other languages and virtual machines could be similarly incorporated); a web browser 224; and the configured user applications 225. Other components can of course be present as well.

Figure 3A:
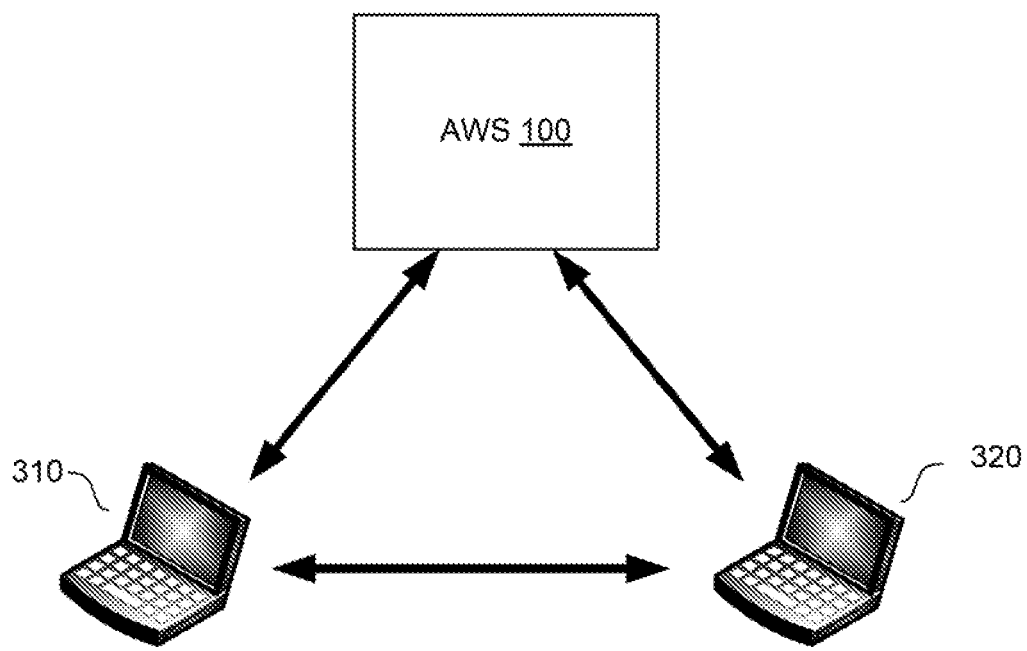
FIGS. 3A-3C illustrate example embodiments of a computing system according to one or more embodiments.

FIG. 3A illustrates computing devices 310 and 320 communicatively coupled to AWS 100. Further, computing devices 310 and 320 are configured to be communicatively coupled with each other.

In various embodiments, computing devices 310 and 320 are one of a personal computing device, a mobile phone, tablet computing device, or the like. In one embodiment, computing device 320 includes a computer dongle coupled to a display device. Further, computing devices 310 and 320 may include functions similar to that of managed workstation 101 described with regard to FIG. 1. In various embodiments, the computing devices may include similar or different operating systems.

Figure 3B:
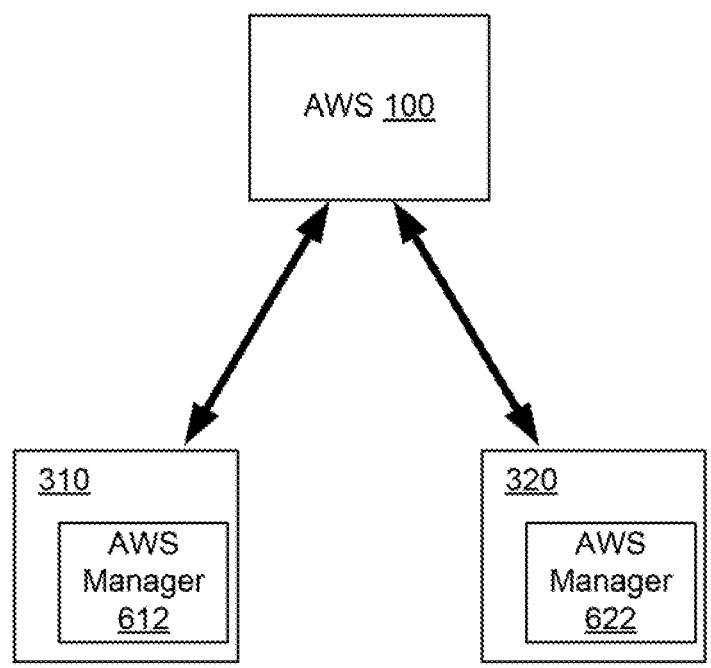
Figure 3C:
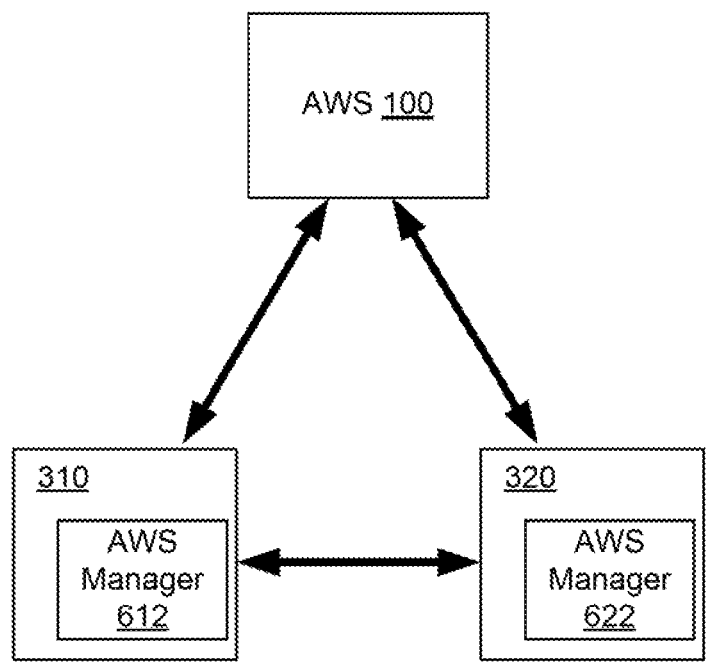

As shown in FIG. 3B and FIG. 3C, computing devices 310 and 320 may include access to an AWS manager. For, example, computing devices 310 and 320 may include access to AWS manager such as AWS manager 201. As will be described in greater detail below, the AWS manager of computing device 320 is configured receive a security context from another computing device (e.g., computing device 310 and/or AWS 100). Computing device 310 may have one or more local applications installed and/or may have access to one or more remote applications. Further, computing device 320 may have one or more local applications installed and/or may have access to one or more remote applications. In one embodiment, frequently accessed applications may be installed on computing device 320. Further, one or more applications may be installed on computing device 320 once computing device 310 is paired with computing device 320.

In one embodiment, computing device 310 is configured to pair with computing device 320 to establish a communication channel between the devices. For example, computing device 310 communicates with computing device 320 via Bluetooth®, wireless local area network, near-field communication (NFC), or the like. In such an example, when computing device 310 is brought within proximity with computing device 320, a communication link may be formed between computing devices 310 and 320. A user of computing device 310 may be provided with a list of available computing devices with which to be paired. The user may select a computing device from the list to initiate a pairing (e.g., establish a communication connection) between the computing devices. In another example, when computing device 310 is brought within proximity to computing device 320, it automatically pairs to computing device 320. In another example, a user may scan a barcode or another identifier of the computing device to which a pairing is desired. After scanning, the user's computing device may then be paired with the desired computing device.

In various embodiments, when computing device 310 is paired with computing device 320, computing device 320 may prevent all other devices from pairing with it until the pairing between computing device 310 and 320 is terminated.

Computing devices 310 and 320 may remained paired until a termination event occurs. In one embodiment, the termination event is a determined based on a signal transmitted from computing device 320 to computing device 310. The signal may be referred to as a keep active signal. When the keep active signal is transmitted from the computing device 310 to computing device 320, the devices will remain paired. However, when the keep active signal is not transmitted back from the computing device 310 to 320, the pairing session between the devices may be terminated. One or more time threshold may be used to determine when to terminate a pairing between devices. For example, a pairing between devices may be terminated when a keep active signal is not returned from computing device 310 to computing device 320 within a threshold period of time. Further, in one embodiment, computing device 310 and/or computing device 310 may issue a termination command to computing device 320 to terminate the pairing between the devices.

Computing device 320 deletes the token and terminates access to the application workspace system using the token once it is disconnected from computing device 310. In one embodiment, computing device 320 communicates a command to AWS 100 that the connection with computing device 310 has been terminated and access to AWS 100 using the token provided by computing device 310 should be terminated. The token may be revoked in response to the termination of the connection between computing devices or in response to a command provided by computing device 310 or 320. In one embodiment, computing device 320 is configured to enter a wait-for-pairing state after it is disconnected from computing device 310.

The AWS manager of computing device 320 may lack security context and/or user entitlements, and as such, computing device 320 is not able to access an application workspace system (e.g., AWS 100). To be authenticated to an application workspace system, computing device 320 is required to be provided with a security context from another computing device (e.g., computing device 310). In one embodiment, the computing device 320 may be considered a staged user enrolled device.

Computing device 310 is configured to share its security context and/or user entitlements with computing device 320 after the devices are paired. The security context and/or user entitlements may be referred to as token. In one embodiment, computing device 310 may directly communicate token with computing device 320. In another embodiment, computing device 310 communicates token to AWS 100, and AWS 100 communicates the token to computing device 320. In yet another embodiment, computing device 310 uploads token to AWS 100 and authorizes one or more applications based on the token. Once authorization occurs, the token is communicated from AWS 100 to computing device 320. In one embodiment, the token may include a process identification identifier.

Computing device 310 is further configured to share application data with computing device 320 after the devices are paired. The application information may include one or more of the application to be executed on computing device 320, location of a server or servers containing the corresponding application, files to be accessed and application content. In one embodiment, computing device 310 is configured to communicate universe resource locator (URL) information to computing device 320.

Computing device 320 authenticates itself with AWS 100 using the token provided by computing device 310. In various embodiments, computing device 320 accesses content corresponding to the application information after computing device 320 is authenticated with AWS 100. In one embodiment, once computing device 320 authenticates itself with AWS 100, computing device 320 installs one or more applications based on the application data provided by computing device 310. In various embodiments, computing device 320 may be configured to launch an application such as a virtual desktop client. The applications may be desktop applications, mobile applications or web based applications. Further, the applications may be natively run on computing device 320 or remotely accessed by computing device 320.

Computing device 310 may be configured to enter a user interface control mode after pairing with computing device 320 and accessing content by computing device 320. The user interface control mode may be used to control the application running on computing device 320. Further computing device 310 may communicate user interface commands to computing device 320 via a wireless communication channel (e.g., Bluetooth®, wireless local area network, NFC, or the like). In one or more embodiments, the user interface controls are application context specific. For example, the user interface commands may be used to alter an image displayed on computing device 320, control a presentation on computing device 320, a movie displayed on computing device 320, cursor control on computing device 320 or the like. In other embodiments, the user interface controls may be configurable.

In one example embodiment, computing device 310 may be a mobile phone and computing device 320 may be a computing dongle coupled with a display device. When the mobile phone comes in proximity to the computing dongle, the mobile phone may be paired with the computing dongle and communicate token and application information to the computing dongle. The computing dongle authenticates itself with an application workspace system using the token and accesses an application based on the application information. The computing dongle then access the content. The application may be executed within a first server and accessed remotely by the computing dongle. Further, the content to be accessed by the application may be stored within second server. In one embodiment, the application may be local to the computing dongle and executed on the computing dongle, and the content maybe stored remotely from the computing dongle within one or more servers. In one example, the application is an application that displays MRI images and MRI images may be displayed on a display of the computing dongle. Further, the mobile phone may be used to send commands to the computing dongle to control the application. These commands may include zooming and/or rotating a displayed image, changing a displayed image, and/or exiting the application.

FIG. 3B illustrates a communication network comprising computing device 310 and computing device 320 communicatively coupled to AWS 100. Computing device 310 includes AWS manager 312 and computing device 320 includes AWS manager 322. Further, as illustrated, computing device 310 is not paired with computing device 320 in the embodiment of FIG. 3B. AWS manager 312 is configured similar to that of AWS manager 201 of FIG. 2. Further, AWS manager 322 is configured similar to that of AWS manager 201, however, AWS manager 322 lacks a user token and is unable to invoke applications from AWS 100.

FIG. 3C illustrations a communication network comprising computing device 310 and computing device 320 communicatively coupled to AWS 100. Further, in the network of FIG. 3B, computing device 320 is paired with computing device 310. Computing device 310 is configured to transmit token and application information to computing device 320. Computing device 320 uses the token to authenticate itself with AWS 100. After it is authenticated, the computing device 320 is able to invoke applications from AWS 100. Additionally, after it is authenticated, the computing device 320 has the same credentials as computing device 310. As such, AWS manager 612 and AWS manager 622 are similarly configured after the token is shared between computing devices and the computing device 320 is configured to access the same applications as computing device 310.

Figure 4:
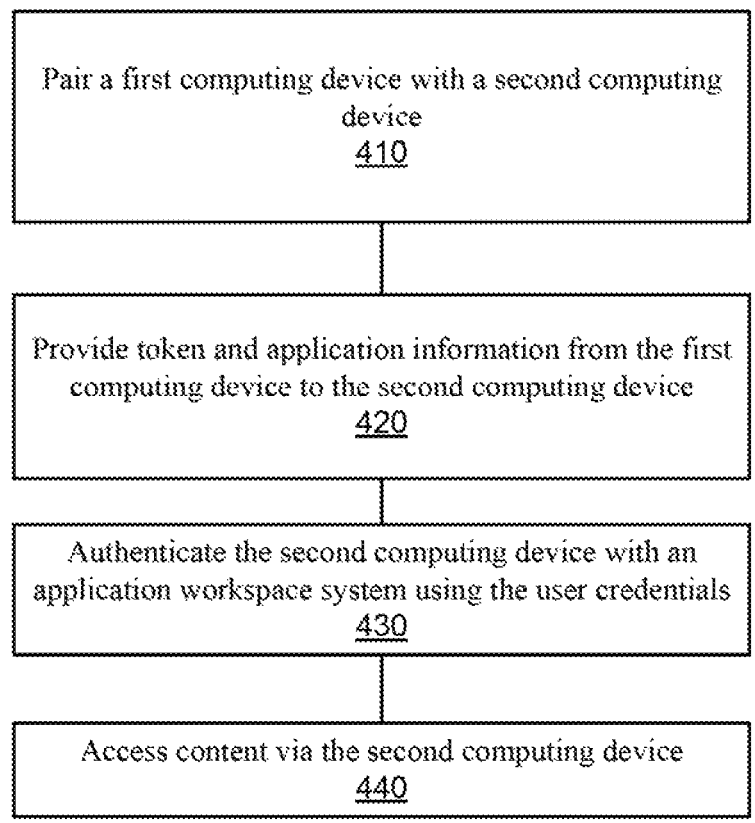
FIG. 4 is an example of a flow diagram for pairing computing devices according to one or more embodiments.

FIG. 4 illustrates a method 400 for sharing a token between computing devices. At step 410 a first computing device is paired with a second computing device forming a communication link between the devices after they are paired. In one embodiment, the computing devices may be paired using a wireless communication protocol (e.g., Bluetooth®, NFC, wireless local area network, or the like.). In one embodiment, when a first computing device is proximate a second computing devices, the devices are automatically paired. In another embodiment, a user of a first computing device selects a computing device from available computing device to pair with the first computing device. In other embodiments, a first computing device may access an identifier of the second computing device to pair the devices. For example, the first computing device may scan a barcode that identifies the second computing device to pair the devices. After scanning the barcode, a wireless communication channel may be created between the devices.

The second computing device prohibits other computing devices from pairing with it while it is paired with the first computing device. For example, the second computing device may stop broadcasting an identification signal when it is paired with the first computing device. Further, the second computing device may block pairing attempts from other computing devices.

At step 420 a token is provided by the first computing device to a second computing device. The token may include security context of a user and/or user entitlement information. Further, the first computing device also provides the second computing device with application information. The application information includes content information that is to be accessed. For example, the application information may include content information, file name or names and a location or locations of content to be accessed. The location information may refer to a server on which the content is stored. Further, the application information may include a reference to the corresponding application that is to be accessed and a location of that application. The application may be located and executed remotely from the second computing device. Alternatively, the application may be executed locally on the second computing device. In one embodiment, the application in located within a first server and the content is located in a second server or servers.

In one embodiment, a first computing device (computing device 310) directly provides the token to a second computing device (computing device 320). In another embodiment, the first computing device (computing device 310) uploads the token to an application workspace system which then communicates the token to the second computing device (computing device 320). The first computing device may communicate an identifier of the second computing device in addition to the token to the application workspace system. The application workspace system may use the identifier to identify which computing device to communicate the token. In one embodiment, after receipt of the token by the second computing device provides an acknowledgement of receipt to the first computing device. The acknowledgement may include a confirmation of the token and the application information. In one embodiment, the token is authorized with an application within the application workspace system before they are communicated to the second computing device.

The application information includes content information from which the AWS selects a corresponding application. In one or more embodiments, the application information includes the application to be access by computing device as 320 as well as the content. The application information may further include the location of a server or servers containing the corresponding application, files to be accessed and application content. In one embodiment, providing the application information comprises communicating universe resource locator information to second computing device.

Content corresponding to the application information is access via the second computing device at step 440. In one embodiment, an application that corresponds to the application information provided by the user may be launched on the second computing devices. In another embodiment, an application may be run remotely and viewed on the second computing device. In one embodiment, the application is a virtual desktop client. The applications may be desktop applications, mobile applications or web based applications. Further, the applications may be natively run on second computing device or be remotely accessed by the second computing device. In one embodiment, the second computing device downloads the application for access after authentication of the second computing device. Further, the second computing device may download data corresponding to the application after authentication. In yet another embodiment, the application or applications may be remotely accessed and streamed to the second computing device. In one embodiment, the AWS selects an appropriate application for the selected content and the application may be run locally on the second computing device or remotely from the second computing device and viewed on the second computing device.

In one embodiment, an application is selected based on content within the application information. The application may be automatically selected or selected by a user from a list. In one embodiment, a user may select content for viewing and AWS 100 may select the corresponding application that will provide the user with access to the content. The application may be local to the second computing device (e.g., computing device 320), or remote from the second computing device and streamed to the second computing device. In one example, content corresponding to an MRI is selected and then communicated to the AWS 100 for viewing. AWS 100 selects an MRI viewer application and launches the content on the second computing device. The MRI viewer application may be local or remote from the second computing device.

In one embodiment, the application may remain installed on the second computing device after the pairing session has been terminated. In another embodiment, the installed application may be removed after the pairing session has been terminated.

The second computing device or the AWS may communicate an indicator to the first computing device providing indication that the content is available on the second computing device. The first computing device may enter a user interface control mode in response to receiving the indicator.

Figure 5:
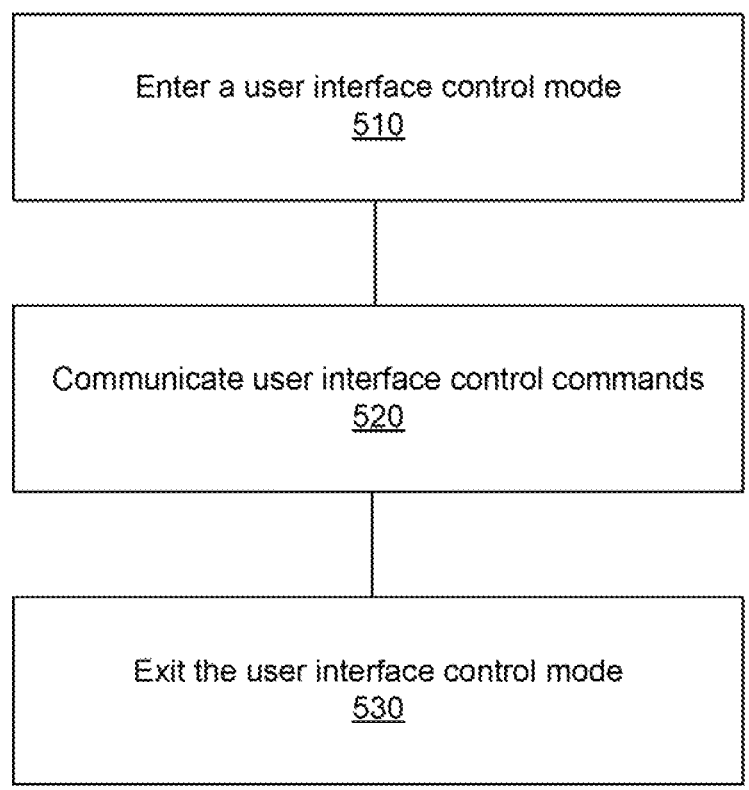
FIG. 5 is an example of a flow diagram for communicating user interface according to one or more embodiments.

FIG. 5 illustrates method 500 for the first computing device to function as a user interface control device. At step 510, the first computing device enters a user interface control mode in response to the indication that the content is available. In other embodiments, the first computing device may change to a user interface control mode in response to providing the token and application information. Further, the first computing device may be manually entered into the user interface control mode by a user.

At step 520, when operating in the user interface control mode, the first computing device communicates user interface commands to control the application of the second computing device. The user interface control mode may be used to control the application accessed by the second computing device. In one embodiment, the commands may be communicated to the second computing device. The second computing device may then communicate the commands to a server (AWS 100) to control the executed application. Further, the second computing device may receive the commands and control an application running locally on the second computing device. In one embodiment, the user interface controls are communicated from the first computing device to a server (e.g., AWS 100) to control content viewed remotely by the second computing device within the executed application. Further the first computing device may communicate user interface commands via a wireless communication protocol (e.g., Bluetooth®, wireless local area network, NFC, or the like). In one or more embodiments, the user interface controls are application context specific. For example, the user interface commands may be used to alter an image displayed on the second computing device, control a presentation on the second computing device, a movie displayed on the second computing device, cursor control on the second computing device or the like. In other embodiments, the user interface controls may be user configurable.

At step 530 of method 500, the first computing device exits the user interface control mode. In one embodiment, the first computing device exits the user interface control mode in response to a termination event, a disconnection from second computing device, or a command received locally. In one embodiment, a user may enter a command within the first computing device to exist the user interface control mode. The command may be a "close" application command, or a command to change between applications. In one embodiment, the user interface control mode may be suspended and then reactivated on the first computing device.

Figure 6:
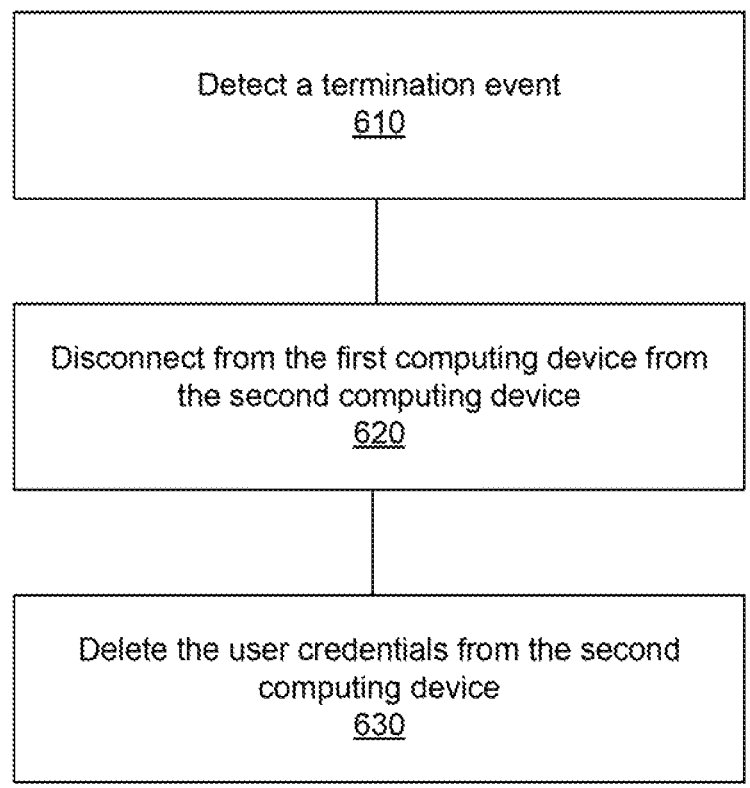
FIG. 6 is an example of a flow diagram for disconnecting computing devices according to one or more embodiments.

FIG. 6 illustrates a method for disconnecting a first computing device from a second computing device. At step 610 of method 600 a termination event is detected. The termination event may initiated by the first computing device or the second computing device. For example, the first computing device may communicate a termination signal to the second computing device. Further, a termination event may be determined based on a transmission and retransmission of a signal between computing devices. For example, computing device 320 may transmit a keep active signal to computing device 310 and wait for a response from the computing device 310. When computing device 310 responds with the keep active signal or a signal based on the keep active signal, the pairing session remains active. However, when the keep active signal is not retransmitted by the computing device 310 to 320, the pairing session between the devices may be terminated. In one embodiment, computing device 320 expects to receive a response from the computing device 310 within a threshold period. If the response is not received within the threshold period, a termination event may be determined to have occurred. In one embodiment, the first or second computing devices may transmit a termination command to the other computing device to terminate the pairing session.

At step 620, the first computing device is disconnected from the second computing device. The first computing device and the second computing device are disconnected based on a detection of a termination event. For example, the pairing session between computing device 310 and computing device 320 may be terminated.

The token and application information maintained by the second computing device are deleted from the second computing device in response to the pairing session between the computing devices being terminated at step 630. Further, the connection with the application workspace system using the credentials is terminated in based on the termination of the pairing session. The second computer system is placed in a wait-for-pairing mode after the pairing session with the first computing device is terminated. When in the wait-for-pairing mode, the second computer system is able to pair with another computer system. In one embodiment, the second computer system makes itself available to other computer system when in the wait-for-pairing mode. For example, the second computer system may be configured to broadcast its identifier when in the wait-for-pairing mode. Further, it may be listed as available for pairing on one or more other computing devices.

Figure 7:
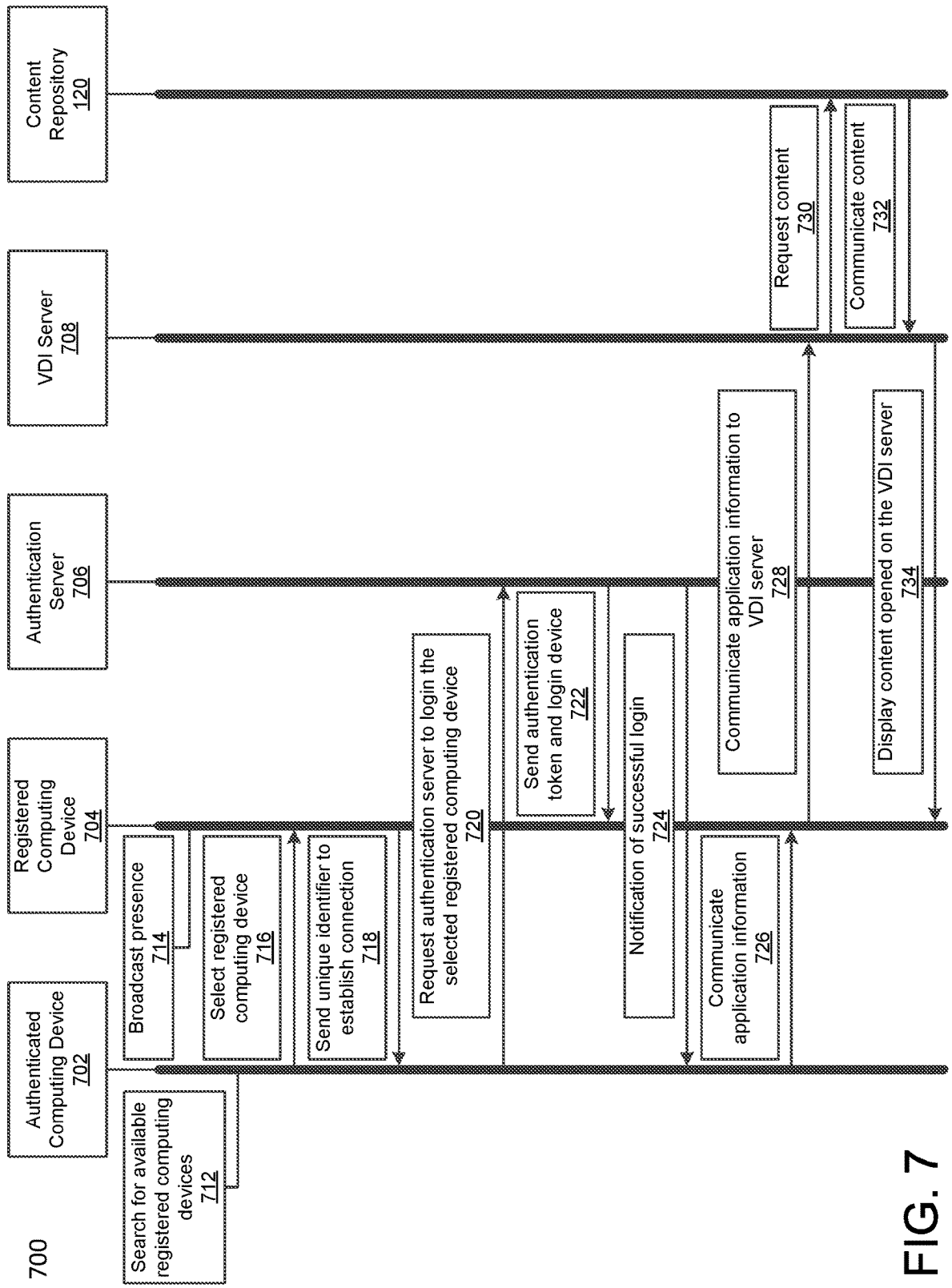
FIG. 7 illustrates an example communication sequence according to one or more embodiments.

FIG. 7 illustrates one example sequence 700 of establishing a link between computing devices to provide one of the computing devices with secure access with the token of the other computing device. As illustrated in FIG. 6, the sequence 700 includes communication between authenticated computing device 702, registered computing device 704, authentication server 706, virtual desktop infrastructure (VDI) 708, and content repository 120. In one embodiment, VDI 708 may be any one of hosted operating environments 150. Further, the authenticated computing device 702 may be managed workstation 101, and the registered computing device 704 may be unmanaged workstation 102. At 712, authenticated computing device 702 searches for available registered computing devices. The registered computing devices 704 broadcast their presence at 714. A registered computing device 716 is selected. In one embodiment, the registered computing device may be selected from a list of devices. Further, the registered computing device may be selected by a user of authenticated computing device 702.

After being selected, the registered computing device 704 communicates a unique identifier to the authenticated computing device 702 to establish a connection at 718. After the connection is established, at 720, the authenticated computing device 702 sends a request to the authentication server 706 to provide the selected registered computing device 704 secure access based on the user's token. The user's token is provided from the authentication server to the registered computing device 704 at 722. Registered computing device 704 is then granted secure access based on the user token. Registered computing device 704 may then be referred to as an authenticated computing device with similar security access as that of authenticated computing device 702. The authentication server 706 also communicates a notification of a successful login of the registered computing device 704 to the authenticated computing device 702.

Authenticated computing device 702 communicates application information to registered computing device 704 at 726 and registered computing device 704 communicates the application information to the server virtual desktop infrastructure (VDI) server 708 at step 728. VDI server 708 provides server-based computing and hosts a desktop operating system on a centralized server in one or more data centers. At 730, the VDI server requests content from the content repository 120 and the content repository communicates the content to VDI server 708 at 732. The content of the VDI server 706 is displayed on the registered computing device 704 at step 734. In one embodiment, an application for viewing content to be displayed on the registered computing device 704 may be run locally on the registered computing device 704 or remotely within the VDI server 708. In one embodiment, the selected application is streamed a first server and the content may be fetched from a second server.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for authentication within an application workspace system, the method comprising:
    pairing a first computing device with a second computing device, the first computing device and the second computing device configured to communicate with the application workspace system, wherein the application workspace system is associated with a plurality of files and applications;
    providing, in response to the pairing, a token and application information from the first computing device to the second computing device, wherein the application information indicates a file or an application of the plurality of files and applications to be accessed via the application workspace system, wherein providing the token includes:
        uploading the token from the first computing device to the application workspace system; and
        communicating the token from the application workspace system to the second computing device;
    authenticating the second computing device with the application workspace system using the token; and
    accessing the file or the application corresponding to the application information by the second computing device via the application workspace system.

2. The method of claim 1, wherein the application information comprises one or more of content information, content server location information, application server information, and a file name.

3. The method of claim 1, the method further comprising prohibiting a third computing device from pairing with the second computing device while the first computing device is paired with the second computing device.

4. The method of claim 1, wherein providing the token and application information from the first computing device to the second computing device comprises:
    communicating the token directly from the first computing device to the second computing device.

5. The method of claim 1, wherein providing the token and application information from the first computing device to the second computing device comprises:
    uploading the token from the first computing device to the application workspace system;

authorizing an application corresponding to the application information to communicate the token with the second computing device; and communicating the token from the application workspace system to the second computing device.

6. The method of claim 1, further comprising communicating user interface commands corresponding to the application information from the first computing device to control content displayed on the second computing device.

7. The method of claim 1, further comprising terminating the pairing between the first computing device and second computing device.

8. The method of claim 1, selecting an application to be viewed within the second computing device based on the application information.

9. A computing device comprising:
a memory; and
at least one processor coupled to the memory, the at least one processor is configured to:
communicate with an application workspace system service of an application workspace system, wherein the application workspace system is associated with a plurality of files and applications;
pair with a second computing device to establish a communication channel with the second computing device; and
provide, in response to the pairing, a token and application information to the second computing device to:
authenticate the second computing device with the application workspace system; and
access a file or an application of the plurality of files and applications that corresponds to the application information by the second computing device,
wherein providing the token includes:
uploading the token from the first computing device to the application workspace system; and
communicating the token from the application workspace system to the second computing device, and
wherein the application information indicates the file or the application to be accessed via the application workspace system.

10. The computing device of claim 9, wherein the computing device is one of a mobile phone, a tablet computing device, and a personal computer.

11. The computing device of claim 9, wherein the application information comprises one or more of content information, content server location information, application server location information, and a file name.

12. The computing device of claim 9, wherein providing the token and application information to the second computing device comprises:
uploading the token to the application workspace system service, and authorizing an application corresponding to the application information to communicate the token with the second computing device, wherein the token is communicated from the application workspace system service to the second computing device.

13. The computing device of claim 9, wherein the at least one processor is further configured to communicate user interface commands corresponding to the application information to control content displayed on the second computing device.

14. The computing device of claim 9, wherein the at least one processor is further configured to communicate a keep active signal received from the second computing device to the second computing device.

15. A non-transitory computer-readable storage medium containing instructions for controlling a computer processor to:
pair a first computing device with a second computing device to establish a communication channel between the first computing device and the second computing device;
provide, in response to the pairing, a token and application information to the second computing device to:
authenticate the second computing device with an application workspace system service of an application workspace system, wherein the application workspace system is associated with a plurality of files and applications; and
access a file or an application of the plurality of files and applications that corresponds to the application information by the second computing device,
wherein the application information indicates the file or the application to be accessed via the application workspace system, and
wherein providing the token includes:
uploading the token from the first computing device to the application workspace system; and
communicating the token from the application workspace system to the second computing device; and
communicate user interface commands from the first computing device to control the file or the application displayed on the second computing device.

16. The non-transitory computer-readable storage medium of claim 15, wherein providing token and application information from the first computing device to the second computing device comprises:
uploading the token to the application workspace system service, and authorizing an application corresponding to the application information to communicate the token with the second device, wherein the token is communicated from the application workspace system service to the second computing device.

17. The non-transitory computer-readable storage medium of claim 15, wherein the instructions further control the computer processor to prohibit a third computing device from pairing with the second computing device while the first computing device is paired with the second computing device.

18. The non-transitory computer-readable storage medium of claim 15, wherein the pairing between the first computing device and second computing device is terminated.

19. The non-transitory computer-readable storage medium of claim 18, wherein terminating the pairing between the first computing device and second computing device comprises:
transmitting a keep active signal from the second computing device to the first computing device; and
determining a lack of transmittal of the keep active signal from the first computing device to the second computing device.

* * * * *